(No Model.)   2 Sheets—Sheet 1.
S. BEAL.
CORN PLANTER.
No. 346,186.   Patented July 27, 1886.
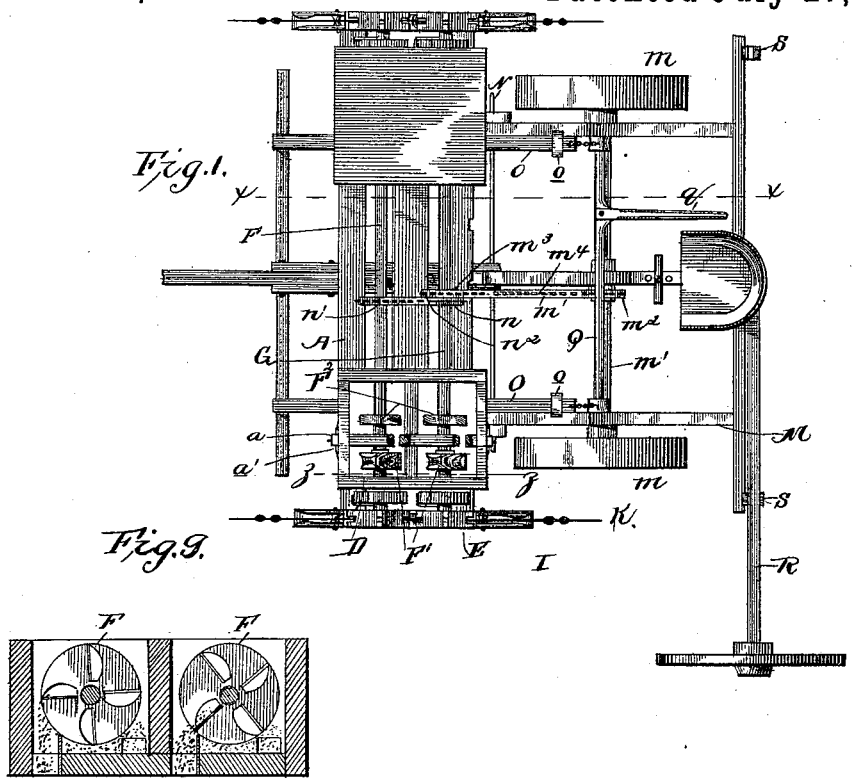
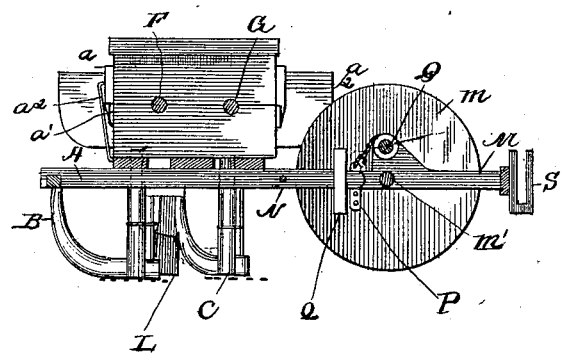
Witnesses
R. C. Laurie
Sarepta Specht
Seth Beal
Inventor
By R. S. & A. P. Lacey
Attys (No Model.) 2 Sheets—Sheet 2.

S. BEAL.
CORN PLANTER.

No. 346,186. Patented July 27, 1886.

Witnesses
R. C. Laurie
R. W. Bishop.

Seth Beal
Inventor;
By R. S. & A. P. Lacey
Attys

UNITED STATES PATENT OFFICE.

SETH BEAL, OF MANCHESTER, IOWA.

CORN-PLANTER.

SPECIFICATION forming part of Letters Patent No. 346,186, dated July 27, 1886.

Application filed April 27, 1886. Serial No. 200,303. (No model.)

*To all whom it may concern:*

Be it known that I, SETH BEAL, a citizen of the United States, residing at Manchester, in the county of Delaware and State of Iowa, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to combined planters and fertilizers.

It consists in the novel features more fully hereinafter set forth and claimed, and shown in the annexed drawings, in which—

Figure 3:
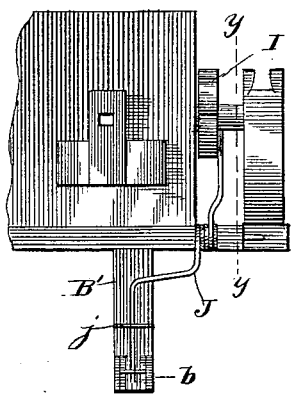
Figure 4:
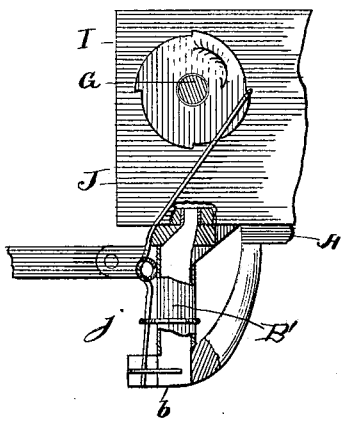
Figure 5:
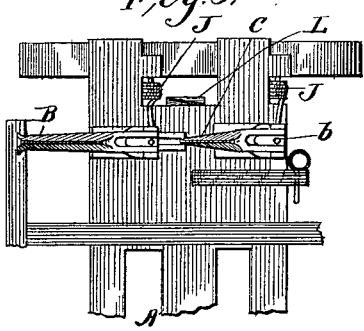
Figure 6:
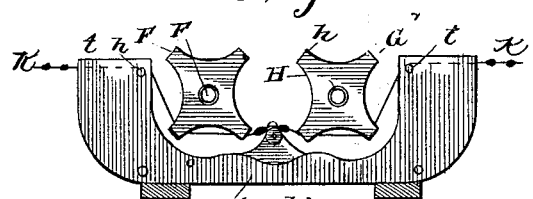
Figure 10:
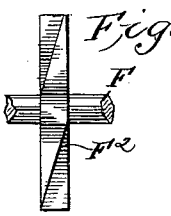
Figure 7:
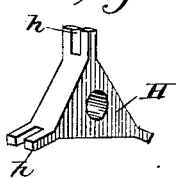
Figure 8:
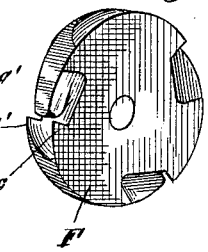
Figure 11:
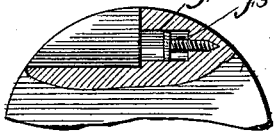

Figure 1 is a plan view of a planter of the construction embodying my improvements. Fig. 2 is a section on the line $x\ x$ of Fig. 1. Fig. 3 is a rear view of one corner of the planter. Fig. 4 is a side view, partly in section, and with parts removed, of the rear portion of the planter. Fig. 5 is a bottom plan view of said portion of the planter. Fig. 6 is an enlarged side view of the check-cord guide, showing the relative positions of the sprocket wheels or plates on the end of the seed or fertilizer shafts. Fig. 7 is a detail perspective view of a modified form of sprocket-wheel. Fig. 8 is an enlarged detail perspective of the grain-wheel. Fig. 9 is a section on the line $z\ z$ of Fig. 1. Fig. 10 is an enlarged perspective detail of the agitator. Fig. 11 is a side view, partly in section, of the upper half of the grain-wheel.

The planter-frame A is supported at each end on two sets of runners, B and C, and is supplied with a double hopper having compartments D and E, the one for grain, the other for fertilizers.

Instead of the double hopper, two single hoppers may be used, each being separable on a medial line and held against lateral displacement by projections $a$, depending from the upper part, fitting between lugs $a'$ on the lower part, and held from vertical displacement by spring-catches $a^2$, engaging said protions.

Shafts F and G are mounted in bearings formed between the two parts of the hopper, so as to be easily removed for repairs, or the one be interchanged for the other. The ends of the shafts are extended beyond the outer sides of the hoppers, and have keyed thereto wheels H, provided with forked arms $h$, arranged at equal distances apart. There may be as many of the arms as desired. Figs. 1 and 6 show the plates having four, whereas Fig. 7 shows the plate having only three. Cams I, keyed on the shafts between the outer side of the hoppers and the forked-arm plates, impinge against the upper ends of levers J, pivoted to the planter-frame. Grain-wheels F', having a series of cups or buckets about their peripheries, are located on the shafts at points corresponding with the positions of the hoppers in which they are designed to work. Agitators F², keyed upon the shafts, work in supplementary hoppers located alongside the main hoppers, to effect a supply of grain and fertilizer thereto. A partition separates the main from the supplementary hoppers, and an opening in the lower part affords a communication between the two. The agitators have their blades set at an incline to the axis of the shafts, so as to force the grain toward the opening and into the main hopper, when it is caught up by the grain-wheel and carried over a partition in the forward portion of the hoppers into a compartment, from which it is delivered to the ground through spouts B', connected with the heel of the runners. Slides or cut-offs $b$, working across the openings in the lower ends of the spouts in grooves in the sides of the bifurcated ends of the runners, check the delivery of the grain and fertilizer till said slides are actuated to uncover said openings in the spouts by means of the cams G, acting on the upper ends of the levers J, which latter have their lower ends connected with the slides. Suitable springs or elastic bands, $j$, return the slides to their normal or closed positions after being acted on by the cam. Runners B and C are in line or track, the former being lower than the latter, so as to plant the grain deeper than the fertilizers.

In the operation of the device the knobs on the check-row cord K actuate the shaft, which, through cam I and lever J, liberates the grain in the spout, which falls into the furrow made by the runner B. Plow L, located between the two runners and to one side of their track, covers the grain. A continued forward movement of the planter brings shaft G in the position previously occupied by the shaft F, which is likewise actuated, and by means of the cam and lever liberates a quantity of fertilizer, which is delivered directly over the grain, and not at the same depth of hill or furrow therewith, thus obviating the difficulties and objections incident to planting the grain and fertilizer in contact in the same hill. As the grain is planted and covered before the deposition of the fertilizer, and as the opening made by the runner C is not as deep as that made by the runner B, a layer or strata of earth intervenes between the grain and fertilizer, thus preventing the latter burning the grain.

The main frame M is supported on wheels m, running in the track of the runners, to cover the fertilizer and compact the earth about the planted grain. The axle m' is divided, so that one wheel may revolve independently of the other. In case it be desired to operate the shafts F and G independent of the check-row cord, as in drilling, one of the parts of the axle is provided with a sprocket-wheel, $m^2$, and the shaft G has a corresponding sprocket-wheel, $m^3$. Sprocket-chain $m^4$, passing around the sprocket-wheels, communicates motion from the axle to the shaft G. Sprocket-wheels n n' on the shafts G and F, respectively, are connected by a chain, $n^2$, which communicates motion from shaft G to shaft F.

The planter and main frames are pivotally connected together by a rod, N. Arms O, projecting from the planter-frame toward the rear, pass through loops o, which limit their movement and form guides. Links P, adjustably connected with the rear ends of these arms, are united with rollers near each end of a shaft, Q, by chains or cords, for the purpose of elevating said arms and regulating the depth of the runners in the ground, by rotating said shaft Q by means of a hand-lever, q. An arm, R, having a gage-wheel on its outer end, is flexibly connected at its inner end with the rear sill of the main frame. It is flattened and fits in a stirrup, S, at each rear corner of the frame.

The machine may be operated from the covering-wheels or by means of the check-cord, which latter passes over rollers t at each end of a guide, T, under the forked-arm plates or wheels on the ends of the shafts and over a pulley, $t^2$, located between the two plates, as shown in Fig. 6.

The grain and fertilizer wheels are all constructed alike; hence a description for one suffices for all. Depressions are cut in the periphery of the wheel at stated intervals, forming flanges f and nose-shaped projections f'. The flanges terminate at the commencement of the projections, and by reason of the sides of the projections being beveled to form a nose shape, a space is left on each side for the surplus grain to escape, which, if it were not for the spaces on either side, would be retained. Within the ends of the projections, at nearly right angles to the radii of the wheel, cavities $f^2$ are formed. Set-screws $f^3$ in the bottom of these cavities regulate their dimensions and capacity; hence govern the quantity of grain in each hill.

While I prefer to plant the grain through the foremost runner, and the fertilizers through the rear or hindmost runner, it is evident that the operation may be reversed—that is, the fertilizer may be planted first and then the grain; but the first-mentioned plan is deemed best in practice, as the fertilizer being above the grain, the moisture coming through or permeating the surface contacting with the fertilizer first takes up a certain percentage of its nourishing substance and conveys the same to the grain or seed below in its downward course.

Having thus described my invention, what I claim, and desire to secure by Letters Patent, is—

1. The combination of the two hoppers, one located in advance of the other, feed-spouts leading therefrom, runners having their lower ends bifurcated and connected with said feed-spouts, cams keyed to the ends of the shafts, cut-offs sliding in grooves in the sides of the bifurcated ends of the runners, levers interposed between the cut-offs and cams for reciprocating the cut-offs, and provisions for actuating said shafts, substantially as described.

2. The combination of the planter and main frames pivotally connected together, arms projecting from the rear of the planter-frame, loops on the main frame engaging said arms and limiting their vertical movement, a revoluble shaft, and adjustable connections intermediate the shaft and the rear ends of the arms, whereby the planter-frame may be adjusted as desired.

3. The herein-described wheel, having depressions in its periphery forming projections, and lateral flanges which terminate at or near the beginning of the projections, leaving spaces on each side for the escape of surplus grain, said projections having cavities therein substantially at right angles to the radii of the wheel.

4. The herein shown and described grain-wheel, having depressions about its periphery forming projections and lateral flanges, the sides of said projections being beveled, leaving spaces on each side between them and the flanges, each projection having a cavity in its face substantially at right angles to the radii of the wheel, and set-screws located in said cavities to adjust their capacity, substantially as and for the purpose set forth.

In testimony whereof I affix my signature in presence of two witnesses.

SETH BEAL.

Witnesses:
N. T. HALE,
JOHN SMALLWOOD.